United States Patent
Didelon et al.

(10) Patent No.: US 8,992,664 B2
(45) Date of Patent: Mar. 31, 2015

(54) BLAST FURNACE TOP GAS RECYCLING PROCESS AND CORRESPONDING RECYCLING EQUIPMENT

(75) Inventors: Fernand Didelon, Longeville-les-Metz (FR); Yves Rachenne, Vantoux (FR); Christian Gillion, Lille (FR); Jean Borlee, Neupre (BE); Dominique Sert, Montoy-Flanville (FR)

(73) Assignee: Arcelormittal Investigación y Desarrollo, S.L., Sestao Bizkaia (ES)

( * ) Notice: Subject to any disclaimer, the term of this patent is extended or adjusted under 35 U.S.C. 154(b) by 574 days.

(21) Appl. No.: 13/257,146

(22) PCT Filed: Mar. 17, 2009

(86) PCT No.: PCT/IB2009/000535
§ 371 (c)(1),
(2), (4) Date: Dec. 13, 2011

(87) PCT Pub. No.: WO2010/106387
PCT Pub. Date: Sep. 23, 2010

(65) Prior Publication Data
US 2012/0090515 A1    Apr. 19, 2012

(51) Int. Cl.
F23N 5/02 (2006.01)
C21B 5/06 (2006.01)
C21B 5/00 (2006.01)
C21B 7/00 (2006.01)
C21B 9/00 (2006.01)

(52) U.S. Cl.
CPC . *C21B 5/06* (2013.01); *C21B 5/001* (2013.01); *C21B 7/002* (2013.01); *C21B 9/00* (2013.01); Y02E 20/328 (2013.01)
USPC .............................................. 75/464; 266/156

(58) Field of Classification Search
CPC .......... C21B 5/001; C21B 7/002; C21B 5/06; C21B 9/00
USPC ..................................... 75/464, 468; 266/156
See application file for complete search history.

(56) References Cited

U.S. PATENT DOCUMENTS 2,395,385 A * 2/1946 Volirath et al. ................. 75/375
3,884,677 A   5/1975 Wenzel et al.
(Continued)

FOREIGN PATENT DOCUMENTS

DE    748 380 C      1/1945
DE    22 61 766 A1   6/1974
(Continued)

OTHER PUBLICATIONS

G. Danloy, et al., "ULCOS—Pilot testing of the low-$CO_2$ Blast Furnace process at the experimental BF in Lulea", La Revue De Metallurgie, vol. 106, No. 1, XP-001521800, Jan. 1, 2009, pp. 1-8.
(Continued)

*Primary Examiner* — Scott Kastler
(74) *Attorney, Agent, or Firm* — Davidson, Davidson & Kappel, LLC (57) ABSTRACT

A process for recycling blast furnace gas is provided. At least one portion of the gases resulting from the blast furnace undergo a $CO_2$ purification step to create a CO-rich gas which is reinjected at a first top injection point at a temperature between 700° C. and 1000° C. through a top injection line, and at a second bottom injection point at a temperature between 1000° C. and 1300° C. through a bottom injection line. The gases from the bottom and top injection lines are heated at a temperature between 1000° C. and 1300° C. A portion of the CO-rich gas exiting the purification step is directly introduced into the top injection line via a cold gas injection line to obtain a temperature between 700° C. and 1000° C. at the first top injection point. The gas that flows through the bottom and top injection points controlled upstream of the system of the heaters. A device is also provided.

20 Claims, 4 Drawing Sheets (56) References Cited

U.S. PATENT DOCUMENTS

| | | | |
|---|---|---|---|
| 4,192,489 A * | 3/1980 | Babich et al. | 266/88 |
| 6,458,181 B1 | 10/2002 | Wolf | |
| 8,545,597 B2 * | 10/2013 | Roth et al. | 75/464 |
| 2012/0090515 A1 * | 4/2012 | Didelon et al. | 110/185 |

FOREIGN PATENT DOCUMENTS

| DE | 37 02 875 C1 | 4/1988 |
|---|---|---|
| DE | 10 2005 017434 A1 | 10/2006 |
| FR | 2 049 293 A1 | 3/1971 |
| JP | 2004309067 A | 11/2004 |
| JP | 2005105046 A | 4/2005 |
| JP | 2007169749 A | 7/2007 |

OTHER PUBLICATIONS

Wolfgang Bender, et al., "Resource efficiency in the steel industry in Germany—status 2008, Part 1: Potentials in steel production", Energy and Environment, vol. 128, No. 11, XP-001519743, Nov. 12, 2008, pp. S125-S126, S128, S130, S132.

* cited by examiner

BLAST FURNACE TOP GAS RECYCLING PROCESS AND CORRESPONDING RECYCLING EQUIPMENT

The invention relates to a process for recycling blast furnace gas in which at least one portion of the gases resulting from the blast furnace undergo a $CO_2$ purification step so as to create a CO-rich gas which is reinjected into the blast furnace. The invention also relates to a device that implements this process.

BACKGROUND

The blast furnace is a gas-liquid-solid counter-current chemical reactor, the main purpose of which is the production of cast iron, subsequently converted to steel by reducing its carbon content.

The blast furnace is fed with solid materials, mainly with sinter, pellets, iron ore and coke, in its upper part. The liquids consisting of cast iron and slag are discharged at the hearth in its lower part.

The conversion of the iron-containing charge (sinter, pellets and iron ore) to cast iron is conventionally carried out by reduction of the iron oxides by a reducing gas (in particular containing CO, $H_2$ and $N_2$), which is formed by combustion of coke at the tuyeres located in the bottom part of the blast furnace where air preheated to a temperature between 1000° C. and 1300° C., called hot blast, is injected.

In order to increase the productivity and reduce the costs, auxiliary fuels are also injected at the tuyeres, such as coal in pulverized form, fuel oil, natural gas or other fuels, combined with oxygen which enriches the hot blast.

The gases recovered in the upper part of the blast furnace, called throat gases, mainly consist of CO, $CO_2$, $H_2$ and $N_2$ in respective proportions of around 22%, 22%, 3% and 53%. These gases are generally used in other parts of the plant as fuel. Blast furnaces are therefore significant producers of $CO_2$.

In view of the considerable increase in the concentration of $CO_2$ in the atmosphere since the beginning of the last century, it is essential to reduce emissions of $CO_2$ where it is produced in a large quantity, and therefore in particular at blast furnaces.

For this purpose, during the last 50 years, the consumption of reducing agents in the blast furnace has been reduced by half so that, at present, in blast furnaces of conventional configuration, the consumption of carbon has reached a low limit linked to the laws of thermodynamics.

One known way of additionally reducing $CO_2$ emissions is to reintroduce throat gases that are purified of $CO_2$ and that are rich in CO into the blast furnace. The use of CO-rich gas as a reducing agent thus makes it possible to reduce the coke consumption and therefore the $CO_2$ emissions.

In one preferred configuration, CO is reintroduced at two levels, on the one hand level with the tuyeres at a temperature of around 1200° C., more largely between 1000° C. and 1300° C. and, on the other hand, level with the waist, in the vicinity of the waist-stack angle of the blast furnace, at a temperature of around 900° C., more largely between 1000° C. and 1300° C. This known system is described with reference to FIG. 1.

Figure 1:
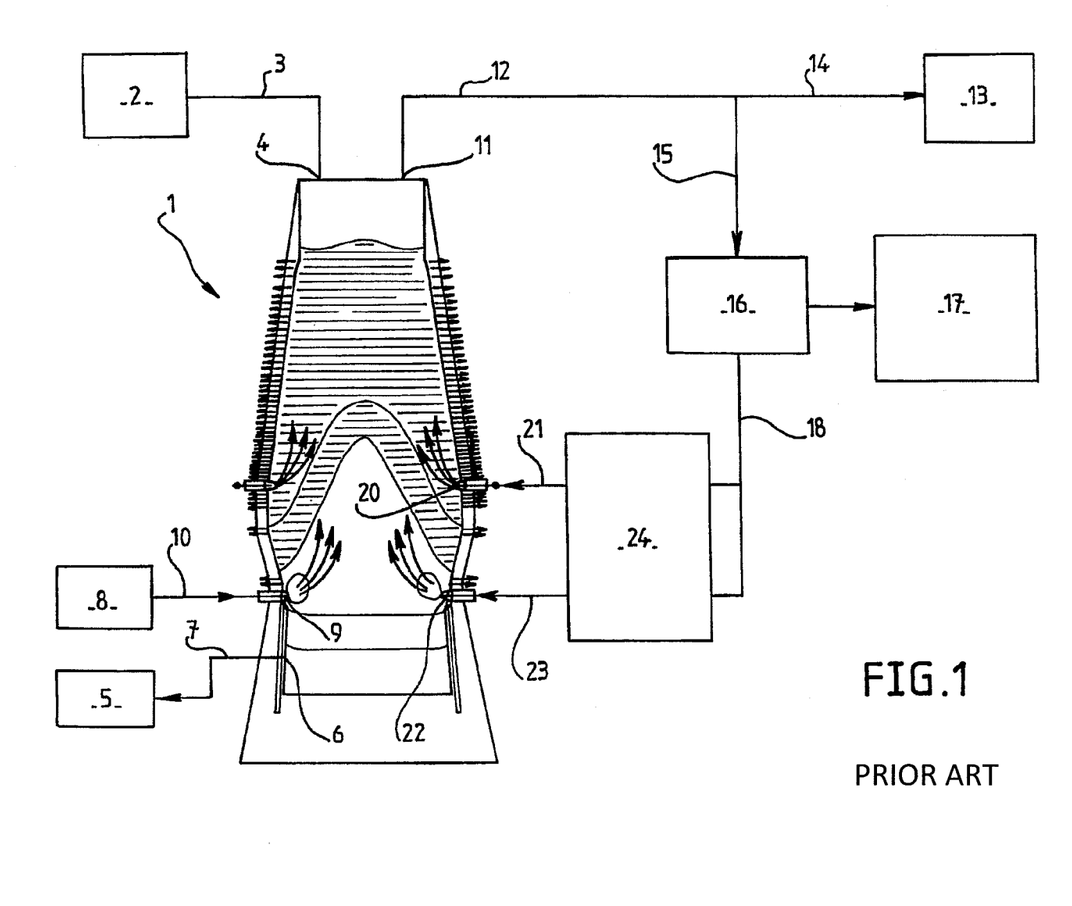
FIG. 1, already described, represents a known device for recycling throat gas.

The blast furnace 1 is fed with coke, with sinter, with pellets, and with iron ore 2 via the line 3 at point 4. The cast iron and the slag 5 are recovered at point 6 level with the hearth via the line 7. Oxygen and coal and/or other auxiliary reducing agents 8 are introduced at point 9 level with the tuyeres via the line 10.

The throat gases are recovered at point 11 of the upper part of the blast furnace by means of the line 12. One portion 13 of these throat gases is exported via the pipe 14 into another device of the site. The other portion of the throat gases is recycled into the blast furnace by means of the pipe 15.

This portion of the throat gases intended to be recycled is purified of most of its $CO_2$ by means of a $CO_2$ purifier. This purifier 16 may, for example, consist of a physicochemical absorption process using a solution of amines, or a pressure swing adsorption (PSA) process or a vacuum pressure swing adsorption (VPSA) process, these processes possibly or possibly not being combined with a supplementary cryogenic step intended to produce pure $CO_2$ 17 ready to be stored in subsoils (this then refers to geological storage) or to be used in specific applications such as the food industry or the enhanced recovery of hydrocarbons from deposits in the final stage of extraction.

The CO-rich gas 18 is then heated in heat exchangers 24, commonly referred to as 'cowpers', then introduced into the blast furnace 1 at a temperature between 700° C. and 1000° C. at point 20 from a top injection line 21, and at a temperature between 1000° C. and 1300° C. at point 22 from a bottom injection line 23.

The specific flow of CO-rich gas required for the top injection line 21 is between 300 and 600 $Nm^3$ per tonne of cast iron and for the bottom injection line 23, it is between 200 and 500 $Nm^3$ per tonne of cast iron.

The difficulty of this configuration is in controlling these flows. Indeed, the CO-rich gas that circulates in the bottom injection line 23 and top injection line 21 is at a temperature above 700° C. for the top injection line and above 1000° C. for the bottom injection line, and it is therefore not possible to use conventional control valves since the latter do not withstand such temperatures, in particular in lines for circulating reducing gas.

SUMMARY OF THE INVENTION

The invention makes it possible to overcome this problem by proposing a process and an associated device that make it possible to inject CO-rich gas into the blast furnace at the bottom and top injection lines at the required temperatures and flows, while ensuring the safety of the device especially if one of the heat exchangers is out of service.

For this purpose, the present invention provides a process for recycling blast furnace gas in which at least one portion of the gases resulting from the blast furnace undergo a $CO_2$ purification step so as to create a CO-rich gas which is reinjected at a first top injection point located above the base of the blast furnace at a temperature between 700° C. and 1000° C. through a top injection line, and at a second bottom injection point at the base of the blast furnace at a temperature between 1000° C. and 1300° C. through a bottom injection line, in which the gases from the bottom and top injection lines are heated by means of heaters from which the gases emerge at a temperature between 1000° C. and 1300° C. This process is characterized in that a portion of the CO-rich gas exiting the purification step is directly introduced into the top injection line via a cold gas injection line in order to obtain a temperature between 700° C. and 1000° C. at the first top injection point, and in that the gas flows through the bottom and top injection points are controlled upstream of the system of heaters.

The process of the invention may also comprise the following optional features taken separately or in combination:

the temperature at the top injection line is measured and the flow of cold gas to be introduced into this top injection line is adjusted according to the temperature measured previously;

the gases of the top and bottom injection lines are heated by two independent heater systems, the gas flows are measured, making it possible to evaluate the gas flows at the respective bottom and top injection points, and the gas flows to be introduced respectively into the first and second heater systems are adjusted according to the gas flows evaluated previously;

the gas flow circulating in the main line for transporting the $CO_2$-purified gas before the cold gas injection line and the gas flow at the inlet to the heater system of the bottom injection line are measured, and the gas flows to be introduced respectively into the first and second heater systems are adjusted in order to obtain the targeted gas flows at the respective bottom and top injection points;

the gas flows to be introduced into the first and second heater systems are controlled, on the one hand, by adjusting the gas flow in the main line for transporting the $CO_2$-purified gas before the cold gas injection line by acting either directly on the gas flow of this line, or on a compressor located upstream of the $CO_2$ purifier 16 into which the gas passes or else on an expansion turbine optionally integrated into the $CO_2$ purifier, and, on the other hand, by adjusting the gas flow at the inlet to the heater system of the bottom injection line;

there is a switch from a configuration in which the gases of the top and bottom injection lines are heated by the two independent heater systems, to a configuration in which the gases of the top and bottom injection lines are heated by a single heater system;

in the configuration with one heater system, the gas flow circulating in the main line for transporting the $CO_2$-purified gas before the cold gas injection line is measured and the gas flow to be introduced into the single heater system is adjusted;

in this configuration, the gas flow that circulates in one or the other or both of the bottom and top injection lines is measured so as to evaluate the gas flow through the bottom and/or top injection points, and the gases from one or the other or both of the bottom and top injection lines pass into a system of singular pressure drops so as to act, substantially even, on the gas flows of the bottom and/or top injection points;

the temperature of the gases of the bottom injection line at the injection point in the bottom part of the blast furnace is around 1200° C., and the temperature of the gases of the top injection line at the injection point in the vicinity of the waist-stack angle of the blast furnace is around 900° C.

The invention also provides a device for recycling blast furnace gas comprising:

a $CO_2$ purifier into which at least one portion of the gases resulting from the blast furnace flows so as to create a CO-rich gas, a top injection line via which CO-rich gas resulting from the purifier is injected at a first top injection point above the base of the blast furnace at a temperature between 700° C. and 1000° C., a bottom injection line via which CO-rich gas resulting from the purifier is injected at a second bottom injection point into the bottom part of the blast furnace at a temperature between 1000° C. and 1300° C., two heater systems that make it possible to heat, respectively, the gas of the top and bottom injection lines, a line for supplying cold gas to the top injection line through which a portion of the CO-rich gas exiting the purifier is introduced into the top injection line at a cold gas injection point in order to obtain a temperature between 700° C. and 1000° C. at the top injection point of the blast furnace, and a system for controlling the gas flows at the respective bottom and top injection points which is located upstream of the heater systems.

The device of the invention may also comprise the following optional features taken separately or in combination:

the device comprises:

at least one system for measuring the temperature of the gas in the top injection line, and at least one system that makes it possible to adjust the flow of cold gas to be injected into the top injection line depending on the temperature of the gas of this top injection line;

the system for controlling the gas flows at the respective bottom and top injection points comprises:

at least one gas flow measurement system that makes it possible to evaluate the gas flows of the bottom and top injection lines at the bottom and top injection points, a system that makes it possible to adjust the gas flows at the inlet to each of the heater systems according to the evaluated gas flows of the bottom and top injection lines;

the device comprises:

a system for measuring the gas flow in the main line for transporting the $CO_2$-purified gas before the cold gas injection line, a system for measuring the gas flow at the inlet to the heater system of the bottom injection line, a system that makes it possible to adjust the gas flow in the main line for transporting the $CO_2$-purified gas before the cold gas injection line, and a system that makes it possible to adjust the gas flow at the inlet to the heater system of the bottom injection line;

the system that makes it possible to adjust the gas flow in the main line for transporting the $CO_2$-purified gas before the cold gas injection line is either a control valve, or a compressor located upstream of the $CO_2$ purifier in which the gas flows or else an expansion turbine optionally integrated into the $CO_2$ purifier;

the heater systems are heat exchangers that each comprise a gas heating system and a heat storage system, it being possible for each of these exchangers to switch from the heat storage function to the gas heating function and vice versa, so as to keep the temperature of the gas emerging from the heater system relatively stable at a temperature between 1000° C. and 1300° C.;

the device comprises switching elements that make it possible to change from the configuration in which the gases of the top and bottom injection lines are heated by the two independent heater systems to a configuration in which the gases of the top and bottom injection lines are heated by a single heater system;

the switching elements comprise a first valve capable of connecting the two pipes for introducing gas into the first and second heater systems and a second valve capable of connecting the top and bottom injection lines before the point for injecting cold gas into the top injection line;

the device comprises, over one or the other or both of the bottom and top injection lines, singular pressure drops that make it possible to act on the gas flows of the bottom and/or top injection points.

BRIEF DESCRIPTION OF THE DRAWINGS

The invention will be better understood on reading the following description, given with reference to the appended figures in which.

DETAILED DESCRIPTION

Figure 3:
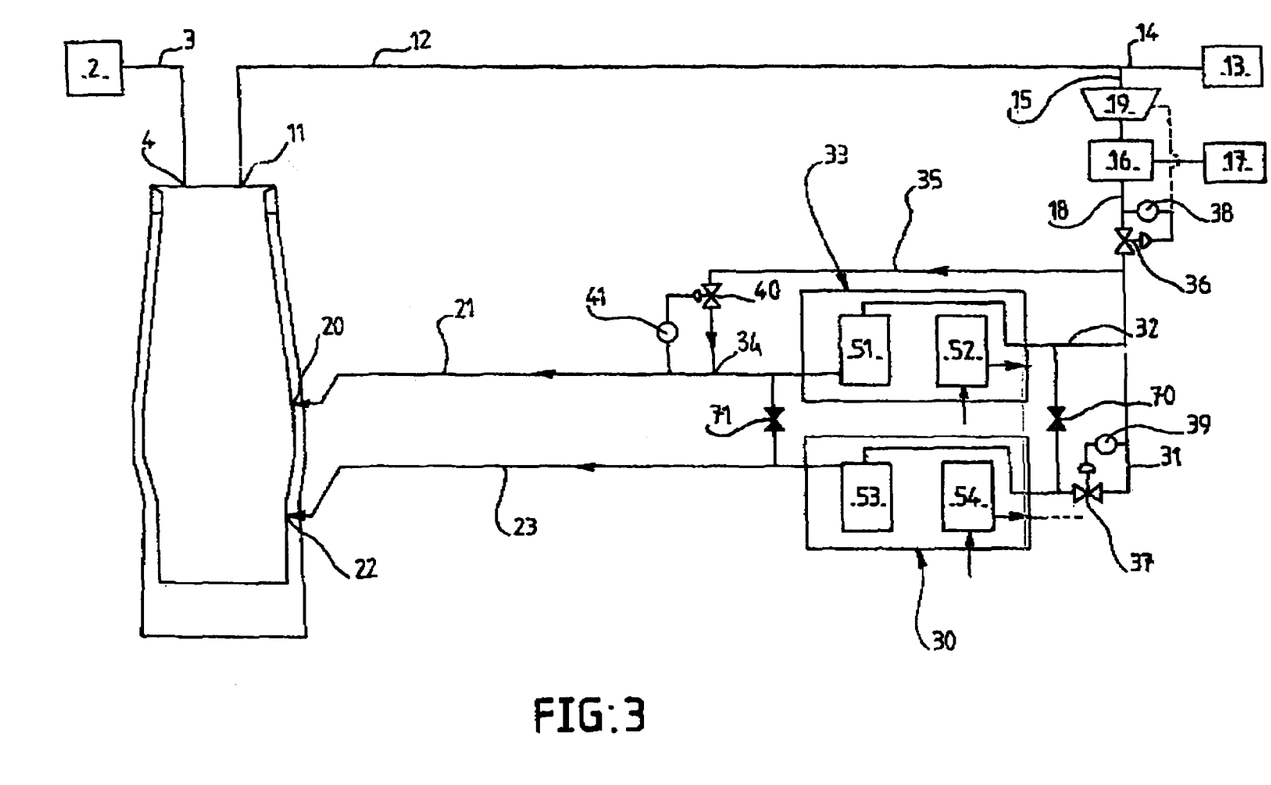
FIG. 3 schematically represents the process and the associated device of the invention, for the configuration in which the gases of the top and bottom injection lines are heated by two independent heater systems.
Figure 4:
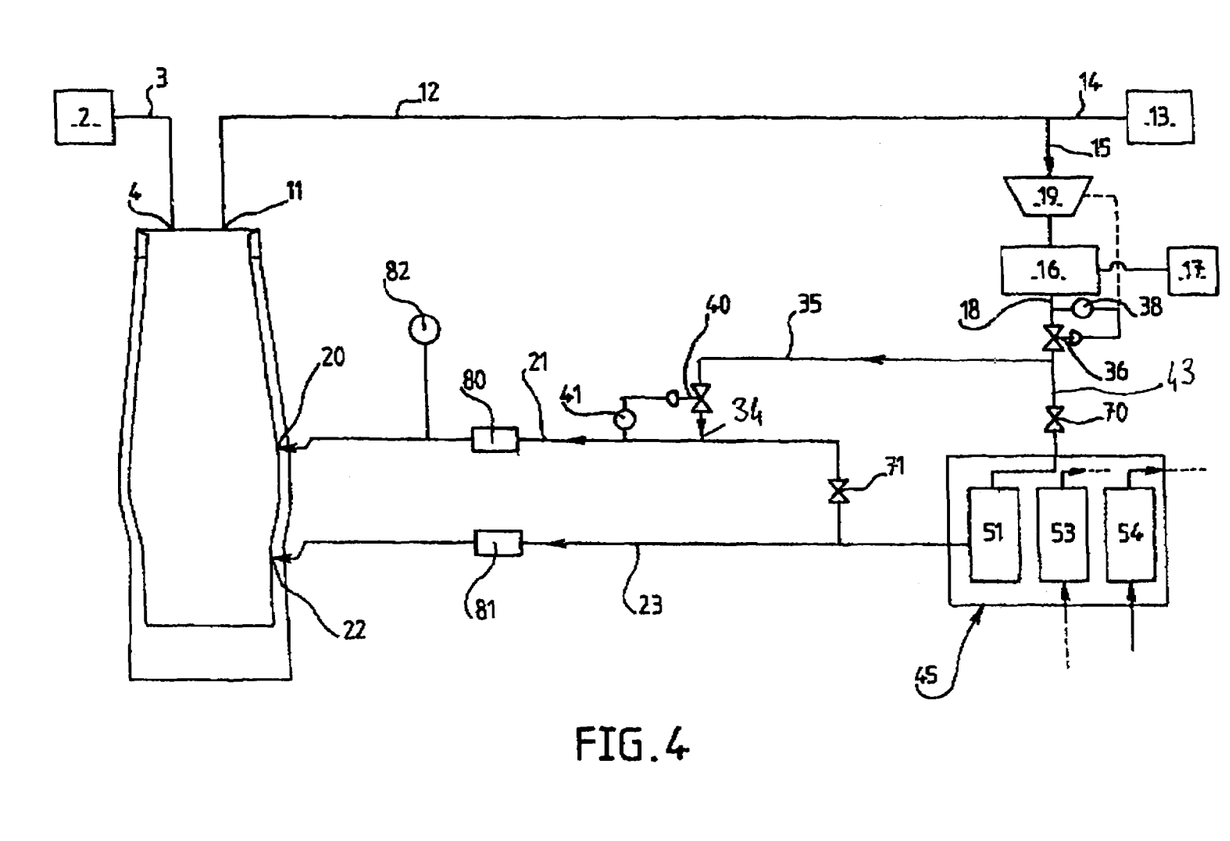
FIG. 4 schematically represents the process and the device used for the configuration in which the gases of the top and bottom injection lines are heated by a single heater system, for example in the event of a problem with one of the heat exchangers.

The common elements of the devices from FIGS. 1, 3 and 4 bear the same references. For the sake of simplicity, the injection of the auxiliary fuels and the recovery of the cast iron and slag are not represented in FIGS. 3 and 4 but are obviously steps that are present in the processes illustrated in these figures.

With reference to FIG. 3, the blast furnace 1 is fed with coke, with iron ore, with pellets and with sinter 2 via the line 3 at point 4.

The throat gases are recovered at point 11 of the upper part of the blast furnace by means of the line 12. One portion 13 of these throat gases is exported via the pipe 14 into another device of the site. The other portion is recycled into the blast furnace by means of the pipe 15.

This portion of the throat gases intended to be recycled is passed into a compressor 19 and is purified of $CO_2$ by means of a $CO_2$ purifier 16 such as an amine absorption unit, a VPSA, a PSA or by one of these devices combined with a supplementary cryogenic step. In the example from FIG. 3, the $CO_2$ purifier is a VPSA 16. Furthermore, the compressor 19 may be integrated into the VPSA 16; it is represented separately from the VPSA for the sake of clarity. The $CO_2$ 17 is stored in the subsoil after having undergone appropriate treatments where necessary.

A portion of the CO-rich gas resulting from the VPSA 16 flows into a main transport line 18 and is sent via a pipe 31 to a first heater system 30 in which it is heated to a temperature of around 1200° C. The hot CO-rich gas resulting from this first heater system 30 is injected at point 22 into the bottom part of the blast furnace level with the tuyeres by means of a bottom injection line 23.

Another portion of the CO-rich gas resulting from the VPSA 16 is sent via a pipe 32 to a second heater system 33 in which it is also heated to a temperature of around 1200° C. The hot CO-rich gas resulting from this second heater system is mixed at the injection point 34 with CO-rich gas resulting from the VPSA which is at a temperature close to ambient temperature by means of a cold gas feed line 35.

The mixing of these two gases according to one operating mode that will be explained later on makes it possible to obtain a CO-rich gas at a temperature of around 900° C., which is injected at point 20 in the vicinity of the waist-stack angle of the blast furnace by means of a top injection line 21.

A first control valve 36 is located in the main line for transporting the $CO_2$-purified gas 18 before the cold gas injection line 35. This valve 36 is connected to a gas flow measurement system 38 also located in the main line for transporting the $CO_2$-purified gas 18 before the cold gas injection line 35. As a variant, the possibility of controlling the flow of the main line of the $CO_2$-purified gas 18 by the compressor 19 of the VPSA 16, as represented by dotted lines in FIG. 3, in place of the control valve 36, will be noted.

A second control valve 37 is located in the pipe 31 at the inlet to the first heater system 30. This valve 37 is connected to a gas flow measurement system 39 also located in this pipe 31.

The device of the invention also comprises a control valve 40 located in the cold gas feed line 35 that makes it possible to adjust the cold gas flow to be injected into the top injection line 21 depending on the temperature of the gases of this line, which is measured by a suitable system 41, so that the CO-rich gas that is injected in the vicinity of the waist-stack angle of the blast furnace remains at a relatively stable temperature of around 900° C.

Measurements of the gas flows at the outlet of the VPSA 16 and at the inlet to the first heater system 30 make it possible to adjust the gas flows at the bottom injection point 22 and top injection point 20 into the blast furnace by means of the valves 36 and 37.

The control of the CO-rich gas flows upstream of the heater systems and the control of the cold gas flow to be injected at the top injection line 21 make it possible to obtain a system in which the temperatures and the flows of the CO-rich gases injected into the blast furnace are relatively stable and controlled without it being necessary to use control valves in the top injection line 21 and bottom injection line 23, in which gases at temperatures respectively above 700° C. and above 1000° C. circulate.

Figure 2:
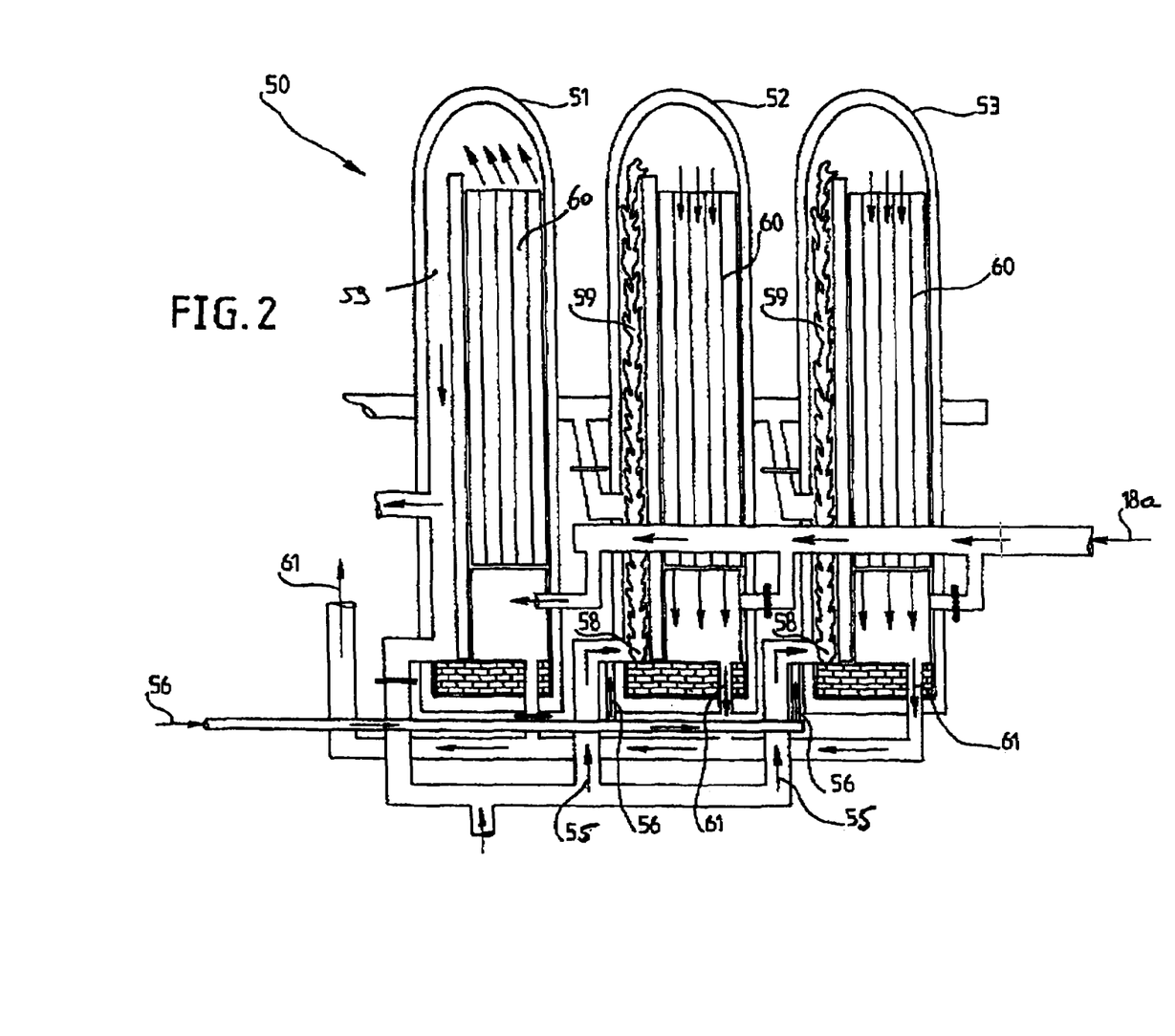
FIG. 2 represents a heater system formed of three cowpers.

The first heater system 30 and second heater system 33 of the embodiment from FIG. 3 are of the type of that represented in FIG. 2. The operation of these heater systems is explained with reference to this FIG. 2.

The heater system 50 from FIG. 2 comprises three heat exchangers 51, 52, 53, two of which are represented in heat storage mode 52, 53 and one in gas heating mode 51. Each of these exchangers is commonly referred to as a cowper.

Each cowper 51, 52, 53 will alternately fulfill the role of heating gas that feeds the injection line in question and the heat storage role.

In each of the two cowpers in heat storage mode 52, 53, a mixture of throat gas and of steelworks gas and/or coking plant gas and/or of any other gas suitable for the process of heating these systems 55, and also air 56, are introduced into a burner 58 located in the lower part of the combustion shafts 59.

The combustion of this gas mixture heats the refractory checker bricks constituting the walls of the checkerwork shaft 60 and flue gases 61 are discharged at the bottom of the checkerwork shaft 60 toward the stacks.

In the cowper in gas heating mode 51, the checker bricks of the checkerwork shaft 60 which have been preheated according to the principle that has just been described, will heat the CO-rich gas 18a that originates from the VPSA 16 (FIGS. 3 and 4) and is introduced via the pipes 31 and/or 32 at the base of the checkerwork shaft 60. The bricks will cool down with the circulation of this CO-rich gas, which is discharged from the cowper 51 at a temperature of around 1200° C. from the combustion shaft 59 to the zone of the blast furnace at which it is injected.

When the bricks are no longer hot enough and when the temperature of the outlet gas is below 1200° C., the cowper 51 switches to its heat storage role whilst, concomitantly, one of the two cowpers 52, 53, for example the cowper 52, switches to a cycle of heating the CO-rich gas. Similarly, when this cowper 52 no longer produces enough heat, it is the last cowper 53 that will provide the heating of the gas whilst the cowper 52 will again enter into a heat storage cycle.

In this configuration with three cowpers, should one of the cowpers be shut down, the system can continue to operate with two cowpers, the first cowper heating the gas, the second being in a heating cycle.

On the other hand, in the first embodiment presented in FIG. 3, provision is made for each of the two heater systems 30,33 to comprise only two cowpers, respectively 51,52 and 53,54.

This configuration is advantageous within the context of the invention. Indeed, a plant comprising two heater systems with three cowpers each would be very expensive. However, operating with two independent heater systems is necessary in order to be able to control the gas flows at the bottom injection point 22 and top injection point 20.

This is why a system has been chosen that has two heater systems each comprising two cowpers.

However, according to this system, if one of the cowpers is out of service, the entire system must be interrupted since the heater system whose cowper is faulty cannot operate with only one cowper.

This is why the invention provides means that make it possible to switch the system from operating with two heater systems having two cowpers each, FIG. 3, to a system with a single heater system having three cowpers, represented in FIG. 4, thus avoiding the complete shutdown of the recycling blast furnace.

To switch from the configuration with four cowpers, to the configuration with three cowpers, a valve 70 connects the pipes 32 and 31, in which the CO-rich gas 18 resulting from the $CO_2$ purifier 16 circulates, to the first heater system 30 and second heater system 33. This valve 70 is kept in the closed position while the system with four cowpers from FIG. 3 is operating. It is ordered open if the system has to switch to operating with three cowpers as represented in FIG. 4, forming a single pipe 43 (FIG. 4), in which the CO-rich gas 18 resulting from the VPSA 16 circulates, to the heater system 45.

Furthermore, a valve 71 connects the top injection line 21 and bottom injection line 23 at a level located before the mixing point 34 via which the cold gas 18 is injected into the top injection line 21. By opening this valve 71 and by immobilizing the inlet and outlet of the cowper that is no longer operating, the gases circulating in the top injection line 21 and bottom injection line 23 are all heated by a single heater system 45 having three cowpers according to the configuration represented in FIG. 4.

In the example represented in the figure, it is the cowper 52 which is shut down; the heater system 45 thus operates with the three other cowpers 51, 53 and 54.

The operation of the system with one heater system 45 comprising three cowpers 51,53,54 is described with reference to FIG. 4.

At the outlet of this heater system 45, the gases are at a temperature of around 1200° C. A portion of this gas is injected at point 22 into the bottom part of the blast furnace level with the tuyeres by means of a bottom injection line 23. The other portion is mixed at point 34 with CO-rich gas resulting from the VPSA 16, which is at a temperature close to ambient temperature, by means of the cold gas feed line 35. The cold gas flow is controlled as for the embodiment from FIG. 3 with the same control valve 40 and the system 41 for measuring the temperature of the gas in the top injection line 21.

The inlet flow into the heater system 45 is controlled by the control valve 36 combined with its flow measurement system 38. The control valve 37 represented in FIG. 3 no longer performs a controlling role, this is why it is not represented in FIG. 4.

In this configuration from FIG. 4, it is not possible to independently control the gas flow of the top feed line 21 and the gas flow of the bottom feed line 23.

To overcome this inability, it is possible to use systems of singular pressure drops 80,81 positioned respectively in the top injection line after the mixing point 34, and in the bottom injection line 23 making it possible, via their design geometry, to modify the gas flows at the respective bottom injection point 22 and top injection point 20 into the blast furnace.

Furthermore, in the system from FIG. 4, it may be necessary to have to measure the gas flow circulating in one or the other or both of the bottom injection line 23 and top injection line 21 for reasons independent of the subject of the invention. A flow measurement of this type carried out by an associated device 82, for example in the top injection line 21, may also help in the control of the flow of the two injection lines 21,23 in particular by making it possible to size the singular pressure drops 80,81 implanted in the respective top injection line 21 and bottom injection line 23. It is possible to provide a single device for measuring the hot gas flow 82 located in one or the other of the bottom injection line 23 and top injection line 21 but also a device for measuring the flow located in each of these two lines 21,23.

It will be noted that the systems of singular pressure drops 80,81 and the device for measuring the hot gas flow 82 were already present in the device represented in FIG. 3, although they were not represented, it being understood that these systems 80,81,82 do not operate within the context of the invention in the configuration with two heater systems.

In any case, the process and the device of the invention make it possible, on the one hand, to control the flow and the temperature of a gas circulating in two injection levels at temperatures above 700° C. using two independent heater systems 30,33 and, on the other hand, to ensure the safety of the system by providing a switchover to a configuration in which admittedly the gas flows of the two injection lines are no longer controlled independently, but in which the blast furnace can nevertheless continue to operate.

One highly advantageous aspect of the invention lies in the simplicity of switching between the configuration with four cowpers (FIG. 3) and the configuration with three cowpers (FIG. 4).

Indeed, the control valves 40 and 36 are used in both systems, without them having to be reconfigured.

As a variant, provision may be made for the valve 36 and its associated flow measurement 38 to be in the pipe 32 at the inlet to the second heater system 33. In this case, to ensure the flows of the top injection line 21 and bottom injection line 23 are controlled, a supplementary flow measurement in the cold gas line 35 will be provided. In this configuration, the switchover to the configuration with a single heater system 45 is more complicated as it involves a reconfiguration of the valve 36 or 37 which will both be used in parallel, upstream of the heater system 45.

As a variant, provision could also be made for the valve 37 and its associated flow measurement 39 to be installed in the pipe 32 at the inlet to the second heater system 33. In this case, to ensure the flows of the top injection line 21 and bottom injection line 23 are controlled, a supplementary flow measurement in the cold gas line 35 will be provided.

As a variant, it is possible to allow for the presence of a single system of singular pressure drops positioned either in the top injection line 21, or in the bottom injection line 23.

It will also be noted that the injection temperature of 900° C. for injecting gas halfway up the blast furnace is an optimum in a range from 700° C. to 1000° C. and that the temperature of the gas of the bottom injection line presented at 1200° C. may be between 1000° C. and 1300° C., maximum temperature of the gas at the outlet of the heat exchangers.

Furthermore, the temperature of the gas at the top injection point 21 is understood as being strictly below 1000° C. and the temperature of the gas at the bottom injection point is understood as being strictly above 1000° C.

What is claimed is:

1. A process for recycling blast furnace gas, the processing comprising:
    subjecting at least one portion of gases resulting from the blast furnace to a $CO_2$ purification so as to create a CO-rich gas which is reinjected at a first top injection point located above a base of the blast furnace at a temperature between 700° C. and 1000° C. through a top injection line, and at a second bottom injection point at the base of the blast furnace at a temperature between 1000° C. and 1300° C. through a bottom injection line, in which the gases from the bottom and top injection lines are heated with at least one heater from which the gases emerge at a temperature between 1000° C. and 1300° C.;
    directly introducing a portion of the CO-rich gas exiting the purification into the top injection line via a cold gas injection line in order to obtain a temperature between 700° C. and 1000° C. at the first top injection point; and
    controlling at least one gas flow through the bottom injection point and top injection point upstream of a system of heaters.

2. The process of claim 1, wherein the temperature at the top injection line is measured, and
    wherein a flow of cold gas to be introduced into this top injection line is adjusted,
    according to the temperature measured previously.

3. The process of claim 2, wherein the gases of the top injection line and bottom injection line are heated by a first and second independent heater systems,
    wherein the gas flows are measured, making it possible to evaluate the gas flows at the bottom injection point and top injection point, and
    wherein the gas flows to be introduced respectively into the first heater system and second heater system are adjusted according to the gas flows evaluated previously.

4. The process of claim 3, wherein the gas flow circulating in a main line for transporting the $CO_2$-purified gas before the cold gas injection line and the gas flow at the inlet to the heater systems of the bottom injection line are measured, and the gas flows to be introduced respectively into the first heater system and second heater system are adjusted in order to obtain targeted gas flows, respectively, at the bottom injection point and the top injection point.

5. The process of claim 4, wherein the gas flows to be introduced into the first heater system and second heater system are controlled, on the one hand, by adjusting the gas flow in the main line for transporting the $CO_2$-purified gas before the cold gas injection line by acting either directly on the gas flow of the main line, or on a compressor located upstream of a $CO_2$ purifier into which the gas passes or else on an expansion turbine optionally integrated into the $CO_2$ purifier, and, on the other hand, by adjusting the gas flow at the inlet to the heater system of the bottom injection line.

6. The process of claim 3, comprising a switch from a configuration in which the gases of the top injection line and bottom injection line are heated by the first and second independent heater systems, to a configuration in which the gases of the top injection line and bottom injection line are heated by a single heater system.

7. The process of claim 6, wherein, in the configuration with one heater system, the gas flow circulating in a main line for transporting the $CO_2$-purified gas before the cold gas injection line is measured and the gas flow to be introduced into the single heater system is adjusted.

8. The process of claim 7, wherein the gas flow that circulates in one or the other or both of the bottom injection line and top injection line is measured so as to evaluate the gas flow through at least one selected from the group consisting of the bottom injection point and the top injection point, and
    wherein the gases from one or the other or both of the bottom injection line and top injection line pass into a system of singular pressure drops so as to act, substantially even, on the gas flows of at least one selected from the group consisting of the bottom injection point and the top injection point.

9. The process of claim 1, wherein the temperature of the gases of the bottom injection line at the injection point in the bottom part of the blast furnace is around 1200° C., and
    wherein the temperature of the gases of the top injection line at the injection point halfway up the blast furnace is around 900° C.

10. A device, comprising:
    a $CO_2$ purifier into which at least one portion of gases resulting from a blast furnace flows so as to create a CO-rich gas,
    a top injection line via which CO-rich gas resulting from a purifier is injected at a first top injection point above a base of the blast furnace at a temperature between 700° C. and 1000° C.;
    a bottom injection line via which CO-rich gas resulting from the purifier is injected at a second bottom injection point into a bottom part of the blast furnace at a temperature between 1000° C. and 1300° C.;
    two heater systems that make it possible to heat, respectively, the gas of the top injection line and bottom injection line;
    a line for supplying cold gas to the top injection line through which a portion of the CO-rich gas exiting the purifier is introduced into the top injection line at a cold gas injection point in order to obtain a temperature between 700° C. and 1000° C. at the top injection point of the blast furnace, and
    at least one system suitable for controlling the gas flows at the respective bottom injection point and top injection point which is located upstream of the heater systems.

11. The device of claim 10, further comprising:
    at least one system suitable for measuring a temperature of the gas in the top injection line; and
    at least one system that makes it possible to adjust a flow of cold gas to be injected into the top injection line depending on the temperature of the gases of this top injection line.

12. The device of claim 10, wherein the system suitable for controlling the gas flows at the bottom injection point and top injection point, respectively, comprises:
    at least one gas flow measurement system that makes it possible to evaluate gas flows of the bottom injection line and top injection line at the bottom injection point and top injection point; and at least one system that makes it possible to adjust the gas flows at the inlet to each of the heater systems according to the evaluated gas flows of the bottom injection line and top injection line and the gas flow of a cold gas line.

13. The device of claim 12, further comprising:
a system suitable for measuring the gas flow in the main line for transporting the $CO_2$-purified gas before the cold gas injection line;
a system suitable for measuring the gas flow at the inlet to one or the other of the heater systems;
a system that makes it possible to adjust the gas flow in the main line for transporting the $CO_2$-purified gas before the cold gas injection line; and
a system that makes it possible to adjust the gas flow at the inlet to one or the other of the heater systems.

14. The device of claim 13, wherein the system that makes it possible to adjust the gas flow in the main line for transporting the $CO_2$-purified gas before the cold gas injection line, is either a control valve, or a compressor located upstream in which the gas flows.

15. The device of claim 10, wherein the heater systems are heat exchangers that each comprise a gas heating system and a heat storage system, and
wherein it being possible for each of the gas heating systems to switch from a heat storage function to a gas heating function and vice versa, so as to keep the temperature of gas emerging from the heater system relatively stable at a temperature between 1000° C. and 1300° C.

16. The device of claim 11, further comprising:
at least one switching element that make it possible to change from a configuration in which the gases of the top injection line and the bottom injection line are heated by the first and the second independent heater systems to a configuration in which the gases of the top injection line and the bottom injection line are heated by a single heater system.

17. The device of claim 16, wherein the at least one switching element comprises
a first valve capable of connecting two pipes suitable for introducing gas into the first heater system and a second heater system; and
a second valve capable of connecting the top injection line and the bottom injection line before a point for injecting cold gas into the top injection line.

18. The device of claim 17, further comprising over one or the other or both of the bottom injection line and the top injection line:
at least one singular pressure drop that makes it possible to act on a gas flow of at least one selected from the group consisting of the bottom injection point and the top injection point.

19. The process of claim 4, comprising a switch from a configuration in which the gases of the top injection line and bottom injection line are heated by the first and second independent heater systems, to a configuration in which the gases of the top injection line and bottom injection line are heated by a single heater system.

20. The process of claim 5, comprising a switch from a configuration in which the gases of the top injection line and bottom injection line are heated by the first and second independent heater systems, to a configuration in which the gases of the top injection line and bottom injection line are heated by a single heater system.

* * * * *